(12) United States Patent
Yamaguchi (10) Patent No.: US 7,262,922 B2
(45) Date of Patent: Aug. 28, 2007

(54) IMMERSION MICROSCOPE OBJECTIVE LENS

(75) Inventor: Kotaro Yamaguchi, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/081,517

(22) Filed: Mar. 17, 2005

(65) Prior Publication Data

US 2005/0207021 A1    Sep. 22, 2005

(30) Foreign Application Priority Data

Mar. 17, 2004    (JP) ............................. 2004-076798

(51) Int. Cl.
*G02B 21/02* (2006.01)
*G02B 9/00* (2006.01)

(52) U.S. Cl. ...................... 359/656; 359/754

(58) Field of Classification Search ......... 359/656–661
See application file for complete search history.

(56) References Cited

U.S. PATENT DOCUMENTS 3,530,436 A * 9/1970 Bertele et al. .............. 359/657
5,659,425 A * 8/1997 Suzuki ........................ 359/658
6,700,710 B2 * 3/2004 Watanabe .................... 359/661
6,747,804 B2 * 6/2004 Fujimoto et al. ........... 359/656

FOREIGN PATENT DOCUMENTS

JP        8-292374        11/1996
JP        2003-121750     4/2003

* cited by examiner

*Primary Examiner*—Jordan M. Schwartz
(74) *Attorney, Agent, or Firm*—Miles & Stockbridge P.C.

(57) ABSTRACT

An immersion microscope objective lens includes, in the following order from an object side to an image side, a first lens group having positive refractive power as a whole, including a first lens component composed of a first meniscus lens and a second meniscus lens cemented to each other with their concave surfaces facing the object side, a second lens composed of a single lens having positive refractive power and a third lens composed of a negative lens and a positive lens cemented to each other, a second lens group having positive refractive power as a whole, including a fourth lens component composed of a negative lens and a positive lens cemented to each other, and a third lens group having a negative refractive power as a whole. Predetermined conditions are satisfied.

14 Claims, 7 Drawing Sheets

IMMERSION MICROSCOPE OBJECTIVE LENS

This application claims the benefit of Japanese Patent application No. 2004-076798 filed on Mar. 17, 2004 which is hereby incorporated by reference.

BACKGROUND OF THE INVENTION

1. Field of the Invention

The present invention relates to an immersion microscope objective lens, and more particularly relates to an immersion, high magnification, apochromat microscope objective lens.

2. Related Background Art

In immersion microscope objective lenses having high magnifications, in order to correct curvature of field, a plano-convex lens having an refractive index lower than that of the frontmost lens (i.e. the lens closest to the object) is inlaid in-the frontmost lens with the planer surface facing the object side to give to the cemented surface therebetween a negative refractive power utilizing the refractive index difference between these lenses so as to reduce the Petzval sum. In addition, a so-called Gauss type lens configuration in which concave surfaces opposed to each other are disposed at a position at which the diameter of the light flux becomes small to reduce the Petzval sum by their strong negative refractive power is also known. The combination of these structures is well known as a structure that can effectively reduce curvature of field.

For example, high magnification, apochromat microscope objective lenses disclosed in Japanese Patent Application Laid-Open Nos. 7-230038, 2000-35541 and 2002-148519 have been known as examples of immersion microscope objective lenses having the above-described structure. In the immersion microscope objective lenses disclosed in these patent documents, the surface of the inlaid lens (i.e. a small diameter lens inlaid in the frontmost lens) that is in contact with the immersion liquid is designed as a planar surface in order to facilitate operations of removing air bubbles and foreign matters etc. in the immersion liquid or in view of ease of processing of the lens itself. In the case that the immersion liquid is oil, the refractive index of the immersion liquid and the refractive index of the inlaid lens can be made substantially equal to each other. (The refractive indices of the oil and the glass are approximately 1.5.) Therefore, even when the surface of the inlaid lens that is in contact with the immersion liquid (which surface will be referred to as the first lens surface) is a planer surface and the incidence angle of incident light is larger than 60°, aberrations generated at that surface are insignificant and errors in the dimension of the aforementioned first lens surface and the thickness of the center have little influence on aberrations.

However, it is preferable for some kinds of specimens to be stored and observed in a state immersed in water. For such specimens it is preferable to use water as the immersion liquid of the immersion microscope objective lens. In the case of the water immersion liquid, its refractive index is as low as 1.33, which is smaller than that of the lens (made of a glass). Thus, there arises the problem that spherical aberrations occur at the interface due to the refractive index difference with the lens. In particular, in designing a lens having a large field of view with a numerical aperture (NA) more than 1.2 while ensuring a minimum necessary working distance, significant high order spherical aberration occurs, and it is difficult to correct the aberration by the succeeding lens groups. In practice, it has been very difficult to correct the spherical aberrations if the difference in the refractive index between the immersion liquid and the lens (or the water and the glass) is larger than 0.1, the aforementioned first lens surface is planar and the numerical aperture of is larger than 1.2.

SUMMARY OF THE INVENTION

The present invention has been made in view of the above-described problems. An object of the present invention is to provide an immersion microscope objective lens in which aberrations are favorably corrected over a wide field of view and over a wide wavelength range even if an immersion liquid having a large refractive index difference (generally, 0.1 or more) with the glass is used to realize excellent imaging performance.

To achieve the object, according to a first aspect of the present invention, there is provided an immersion microscope objective lens including, in the following order from an object side to an image side, a first lens group having positive refractive power as a whole, a second lens group having positive refractive power as a whole and a third lens group having negative refractive power as a whole. The first lens group includes, in the following order from the object side to the image side, a first lens component composed of a first meniscus lens and a second meniscus lens cemented to each other with their concave surfaces facing the object side, a second lens composed of a single lens having positive refractive power and a third lens composed of a negative lens and a positive lens cemented to each other. The second lens group includes a fourth lens component composed of a negative lens and a positive lens cemented to each other. The following conditions are satisfied:

$$1 < |r_1/F| < 50$$

$$0.1 < |r_2/F| < 1.5$$

where, $r_1$ is the radius of curvature of the surface of the first meniscus lens that is in contact with the immersion liquid, $r_2$ is the radius of curvature of the interface surface of the first meniscus lens and the second meniscus lens, and F is the focal length of the whole system.

According to a second aspect of the present invention, in the immersion microscope objective lens according to the first aspect of the present invention, the following condition is satisfied:

$$|n_{12} - n_{11}| > 0.3$$

where $n_{12}$ is the refractive index of the first meniscus lens and $n_{11}$ is the refractive index of the second meniscus lens.

According to a third aspect of the present invention, in the immersion microscope objective lens according to the first or third aspect of the invention, the second lens group includes, in the following order from the object side to the image side, the fourth lens component, a fifth lens component composed of a negative lens and a positive lens cemented to each other, a sixth lens component composed of a negative meniscus lens with a convex surface facing the object side, a biconvex lens and a biconcave lens cemented to each other in the mentioned order from the object side.

According to a fourth aspect of the present invention, in the immersion microscope objective lens according to any one of the first to third aspects of the present invention, the third lens group includes, in the following-order from the object side to the image side, a seventh lens component composed of a positive lens and a negative lens cemented to each other and having a meniscus lens shape with a convex surface facing the object side and an eighth lens component composed of a negative lens and a positive lens cemented to each other and having a meniscus lens shape with a concave surface facing the object side, and the following conditions are satisfied:

$$n_{71}>1.49$$

$$n_{82}>1.6$$

where $n_{71}$ is the refractive index of the positive lens that constitutes the seventh lens component and $n_{82}$ is the refractive index of the positive lens that constitutes the eighth lens component.

In the immersion microscope objective lens according to the present invention, various aberrations (such as spherical aberration, chromatic aberration, astigmatism and coma) can be corrected excellently over a large field of view and over a large wavelength range, even if an immersion liquid having a large refractive index difference (generally, 0.1 or more) with the glass is used, and it is possible to achieve excellent imaging performance.

DESCRIPTION OF THE PREFERRED EMBODIMENTS

Figure 1:
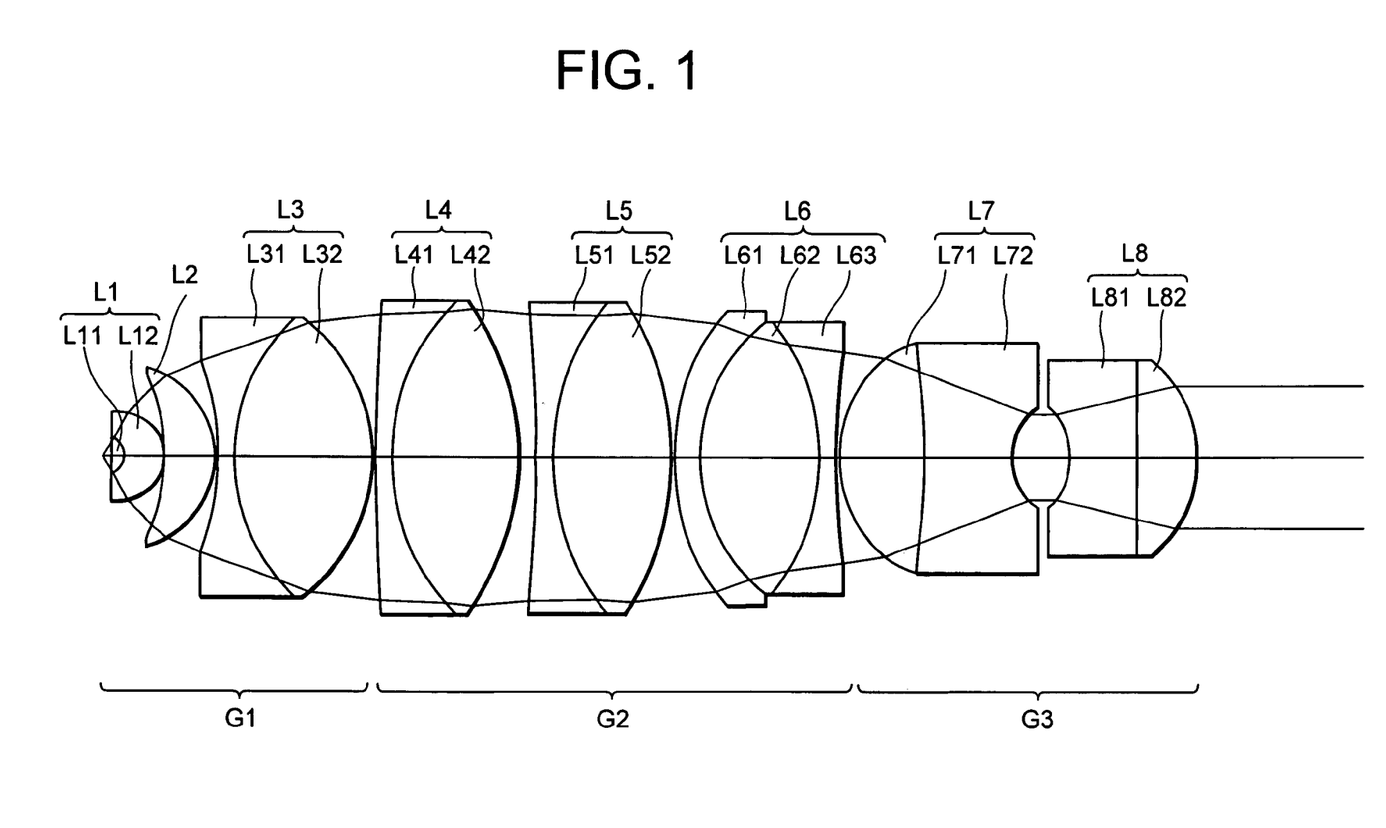
FIG. 1 is a diagram showing the lens configuration of an immersion microscope objective lens according to a first embodiment of the present invention.
Figure 3:
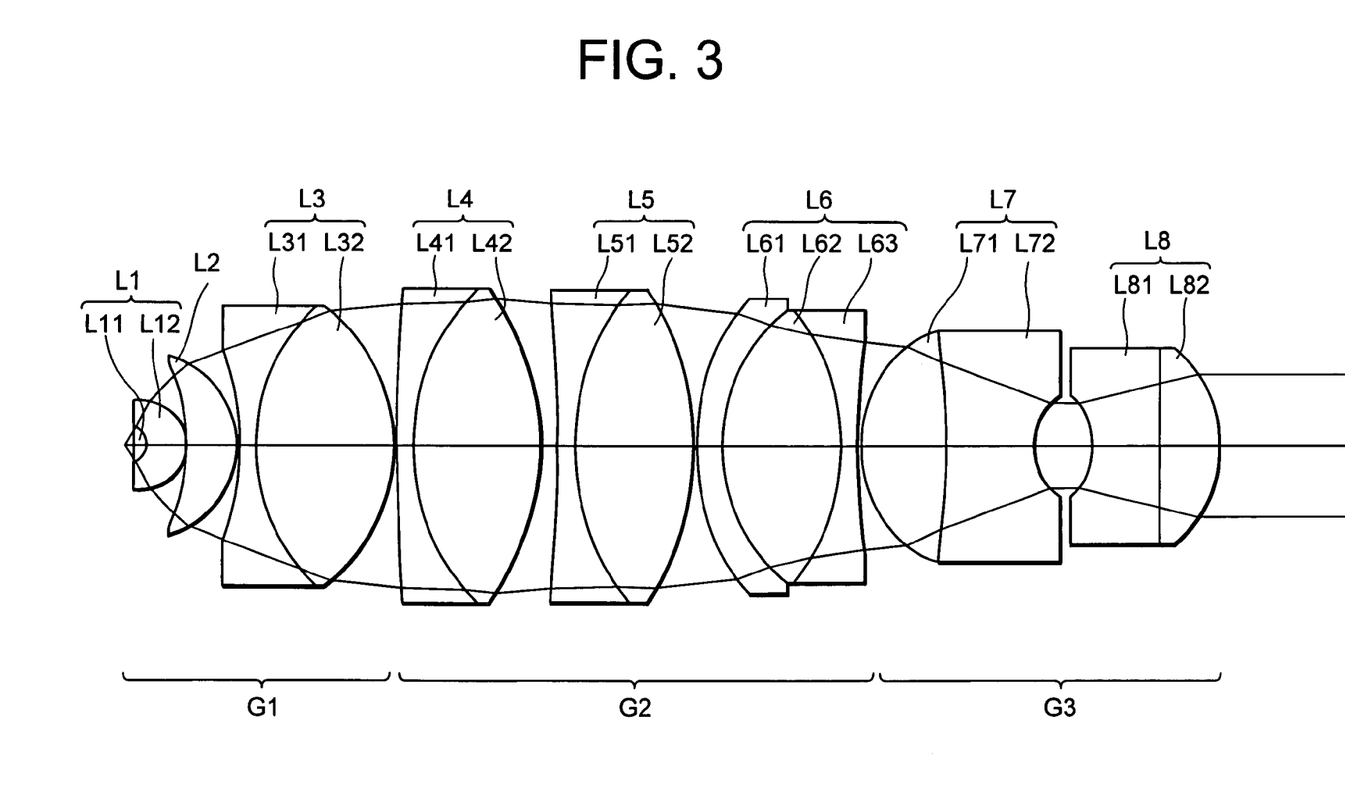
FIG. 3 is a diagram showing the lens configuration of an immersion microscope objective lens according to a second embodiment of the present invention.
Figure 5:
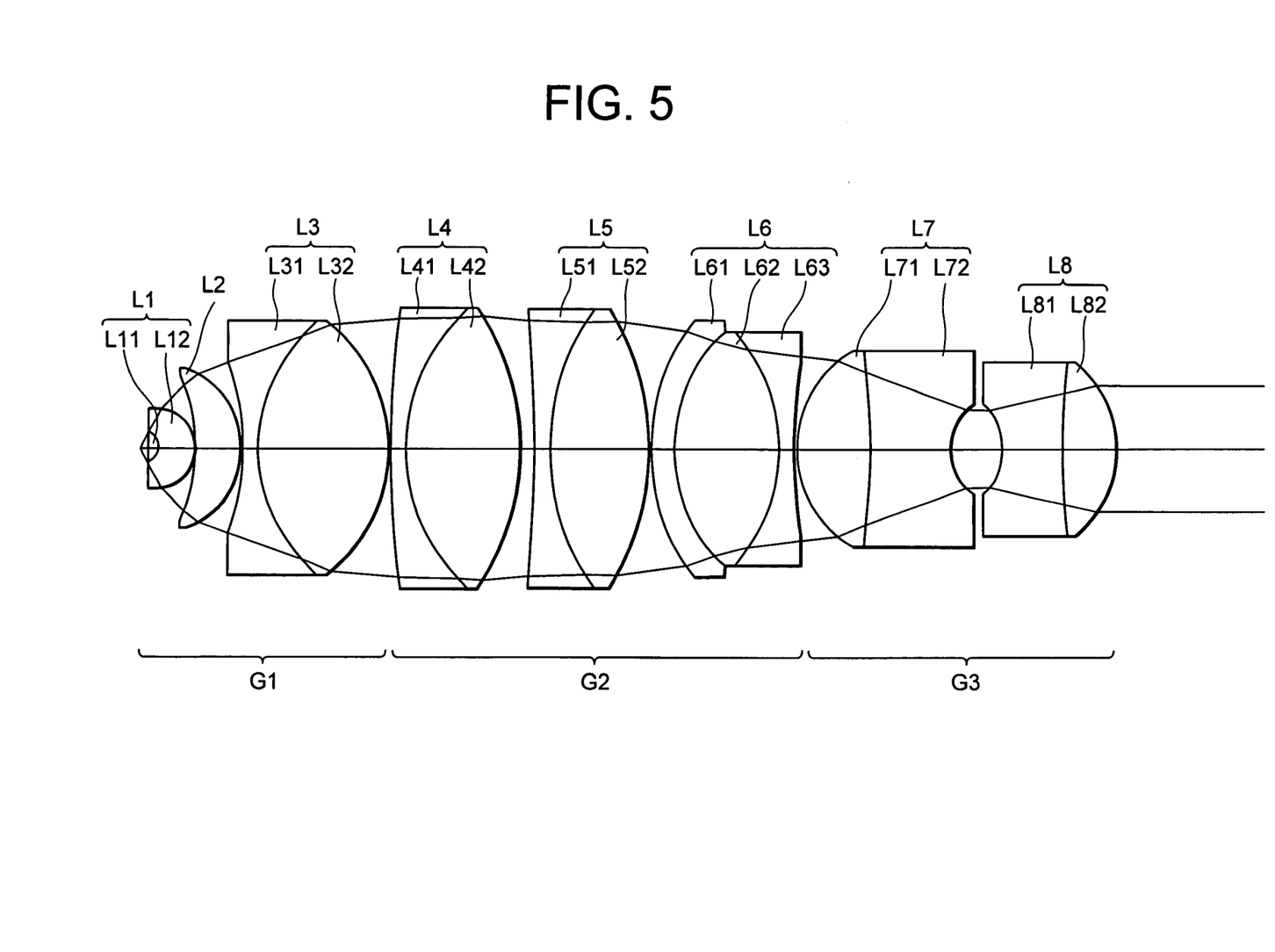
FIG. 5 is a diagram showing the lens configuration of an immersion microscope objective lens according to a third embodiment of the present invention.

In the following, preferred embodiments of the present invention will be described with reference to the annexed drawings. FIGS. 1, 3 and 5 are diagrams showing the lens configurations of immersion microscope objective lenses according to the first to third embodiments of the present invention respectively. Each of the immersion microscope objective lenses including, in the following order from an object (specimen) side to an image side, a first lens group G1 having positive refractive power as a whole, a second lens group G2 having positive refractive power as a whole and a third lens group G3 having negative refractive power as a whole.

The first lens group G1 includes, in the following order from the object side to the image side, a first lens component L1 composed of a first meniscus lens L11 and a second meniscus lens L12 cemented to each other with their con-cave surfaces facing the object side, a second lens L2 composed of a single lens having positive refractive power and a third lens component L3 composed of a negative lens L31 and a positive lens L32 cemented together. The first meniscus lens L11 is a positive meniscus lens having a weakly curved concave surface facing the object side, and the second meniscus lens L12 is a negative meniscus lens having a concave surface facing the object side. The first meniscus lens L11 has a diameter smaller than that of the second meniscus lens L12, and the convex, image-side surface of the first meniscus lens L11 is cemented with the concave, object-side surface of the meniscus lens L12 in such a way as to be inlaid. In other words, the first meniscus lens L11 is designed as an inlaid lens that is inlaid on the object side surface of the frontmost lens (i.e. the second meniscus lens L12) disposed at the position closest to the object side. The second lens L2 is a positive meniscus lens arranged with its concave surface facing the object side. In the third lens component L3, the negative lens L31 is a biconcave lens and the positive lens L32 is a biconvex lens, where the negative lens L31 is arranged on the object side of the positive lens L32.

The second lens group includes, in the following order from the object side to the image side, a fourth lens component L4 composed of a negative lens L41 and a positive lens L42 cemented to each other, a fifth lens component L5 composed of a negative lens L51 and a positive lens L52 cemented to each other and a sixth lens component L6 composed of a negative meniscus lens L61, a biconvex lens L62 and a biconcave lens L63 cemented to each other in the mentioned order. In the fourth lens component L4, the negative lens L41 is a negative meniscus lens with a convex surface facing the object side, and the positive lens L42 is a biconvex lens, where the negative lens L41 is arranged on the object side of the positive lens L42. In the fifth lens component L5, the negative lens L51 is a biconcave lens, and a positive lens L52 is a biconvex lens, where the negative lens L51 is arranged on the object side of the positive lens L52. In the sixth lens component L6, the negative meniscus lens L61 with a convex surface facing the object side is arranged closest to the object side.

The third lens group G3 includes a seventh lens component L7 composed of a positive lens L71 and a negative lens L72 cemented to each other and a eighth lens component L8 composed of a negative lens L81 and a positive lens L82 cemented to each other. In the seventh lens component L7, the positive lens L71 is a biconvex lens and the negative lens L72 is a biconcave lens. The seventh lens component L7 has a meniscus lens shape as a whole arranged with a convex surface facing the object side (namely, the positive lens L71 is arranged on the object side). In the eighth lens component L8, the negative lens L81 is a planoconcave lens (in the first embodiment) or a biconcave lens (in the second and third embodiments), and the positive lens L82 is a planoconvex lens (in the first embodiment) or a biconvex lens (in the second and third embodiments). The eighth lens component L8 has a meniscus lens shape as a whole arranged with a concave surface facing the object side (namely, the negative lens L81 being arranged on the object side).

As described above, the first meniscus lens L11 in the form of an inlaid lens is a positive meniscus lens having a weakly curved concave surface facing the object side. With this feature, even in the case that the difference (refractive index difference) between the refractive index of the first meniscus lens L11 and the refractive index of the immersion liquid used in contact therewith is larger than 0.1 (namely, in the case that the condition $|n_0-n_{11}|>0.1$ holds, where $n_0$ is the refractive index of the immersion liquid and $n_{11}$ is the refractive index of the first meniscus lens L11), high order spherical aberration generated at the interface of the first meniscus lens L11 and the immersion liquid is effectively reduced. Specifically, in the immersion microscope objective lens according to the present invention, the incidence-angle of light fluxes from the object is made small by designing the interface of the first meniscus lens L11 and the immersion liquid as a concave surface, thereby suppressing generation of high order spherical aberration. In addition, since the interface between the first meniscus lens L11 and the second meniscus lens L12 as the frontmost lens on which the first meniscus lens L11 is inlaid is assigned with a strong negative refractive power, the Petzval sum is effectively reduced.

Light fluxes from the object are gently refracted by the second lens L2 having positive refractive power after emergent from the first lens component L1. By designing the refractive power of the image side surface of the second lens L2 larger than that of the object side surface, it is possible to restrict the deflection angle of the marginal rays (the outermost rays among the light fluxes emergent from the object point on the optical axis) to a small angle. Furthermore, by designing the negative lens L31 and the positive lens L32 that constitute the third lens component L3 in such a way as to have refractive indices close to each other (i.e. to have an insignificant refractive index difference) and different dispersions, it is possible to excellently correct longitudinal chromatic aberration and chromatic (i.e. caused by wavelength differences) spherical aberration generated at image-side, strongly-curved convex surfaces of the first lens component L1 and the second lens L2 respectively.

Divergent light emergent from the first lens group G1 is converted into convergent light by the second lens group G2 having positive refractive power as a whole. The second lens group G2 includes the fourth lens component L4 composed of the negative lens L41 and the positive lens L42 cemented to each other as described above, and the aforementioned divergent light passes through the fourth lens component L4. Thus, the spherical aberration and the longitudinal chromatic aberration included in the divergent light is favorably corrected. Furthermore, the second lens group G2 includes, in addition to the fourth lens component L4, the fifth lens component L5 composed of the negative lens L51 and the positive lens L52 cemented to each other and the sixth lens component L6 composed of the negative meniscus lens L61, the biconvex lens L62 and the biconcave lens L63 cemented to each other. Thus, aberrations are corrected further.

Since the third lens group G3 is designed to have negative refractive power as a whole, it can realize well-balanced correction of longitudinal chromatic aberration and lateral chromatic aberration. Particularly, it is preferable that this third lens group G3 have a so-called Gauss type lens configuration, which can effectively correct the Petzval sum.

In any of the above-described immersion microscope objective lenses, the following conditions are met.

$$1 < |r_1/F| < 50 \tag{1}$$

$$0.1 < |r_2/F| < 1.5 \tag{2}$$

In these conditions (1) and (2), $r_1$ represents the radius of curvature of the surface of the first meniscus lens L11 that is in contact with the immersion liquid, $r_2$ represents the radius of curvature of the interface surface between the first meniscus lens L11 and the second meniscus lens L12, and F represents the focal length of the whole system.

The above condition (1) prescribes the radius of curvature of the surface of the first meniscus lens L11 serving as an inlaid lens that is in contact with the immersion liquid (which surface will be referred to as the first lens surface, and which corresponds to the surface designated by surface no. 1 in the first to third examples that will be described later). If the value of $|r_1/F|$ exceeds the upper limit value in condition (1) (namely, when the radius of curvature of the first meniscus lens L11 is too large), the incidence angle of light fluxes from the object becomes excessively large, and it is difficult to correct high order spherical aberration by the lenses in the succeeding lens groups. If the value of $|r_1/F|$ is smaller than the lower limit value in condition (1) (namely, when the radius of curvature of the first meniscus lens L11 is too small), it is difficult to eliminate air bubbles and foreign matters contained in the immersion liquid. To achieve more excellent imaging performance in the numerical aperture (NA) range of more than 1.2, it is preferable that the lower limit value in condition (1) be 3 and the upper limit value thereof be 9.

The above condition (2) prescribes the radius of curvature of the contact surface between the first meniscus lens L11 and the second meniscus lens L12 that constitute the first lens component L1. If the value of $|r_2/F|$ exceeds the upper limit value in condition (2), sufficient refractive power can not be achieved at the contact surface between the aforementioned lenses L11 and L12, the Petzval sum becomes large, and the flatness of the image surface is deteriorated. If the value of $|r_2/F|$ is smaller than the lower limit value in condition (2), the radius of curvature of the contact surface between the first meniscus lens L11 and the second-meniscus lens L12 that constitute the first lens component L1 becomes too small to process it. In connection with this, to achieve more excellent imaging performance while correcting the curvature of field up to a field of view number of 25, it is preferable that the lower limit value in condition (2) be 0.2 and the upper limit thereof be 0.6.

With the above-described configuration, even in the case that the immersion liquid is, for example, water and the difference in the diffractive index between the immersion liquid and the inlaid lens (i.e. the glass material of the first meniscus lens L11) is large (generally more than 0.1), aberrations generated at their interface surface can be corrected by the succeeding lens groups. Accordingly, aberrations (such as spherical aberration, chromatic aberration, coma and curvature of field) can be corrected excellently over a wide field of view (or a high NA) and a wide wavelength range. Thus, it is possible to achieve excellent imaging performance (see examples that will be presented later).

In the above-described immersion microscope objective lenses, it is preferable that the following condition be satisfied.

$$|n_{12} - n_{11}| > 0.3 \tag{3}$$

In condition (3), $n_{11}$ is the refractive index of the first meniscus lens L11 and $n_{12}$ is the refractive index of the second meniscus lens L12.

The above condition (3) prescribes the refractive power of the contact surface between the first meniscus lens L11 and the second meniscus lens L12 that constitute the first lens component L1. If the value of $|n_{12} - n_{11}|$ is smaller than the lower limit value of condition (3), the refractive index difference of these lenses becomes too small, and sufficient refractive power cannot be achieved at their contact surface, the Petzval sum becomes large, and the flatness of the image surface is deteriorated. In connection with this, to achieve more excellent imaging performance while correcting the curvature of field up to a field of view number of 25, it is preferable that the lower limit value in condition (3) be 0.35.

In the immersion microscope objective lens according to the present invention, the third lens group G3 as a whole is required to have negative refractive power. Although no particular limitation is placed on the lens configuration of the third lens group, better aberration correction is achieved if the third lens group G3 includes a seventh lens component L7 as a cemented lens composed of a positive lens L71 and a negative lens L72 cemented to each other and having a meniscus lens shape with a convex surface facing the object side and a eighth lens component L8 as a cemented lens composed of a negative lens L81 and a positive lens L82 cemented to each other and having a meniscus lens shape with a concave surface facing the object side, as with the immersion microscope objective lenses presented as the first to third embodiments. In this case, it is preferable that the refractive index $n_{71}$ of the positive lens in the seventh lens-component L7 and the refractive index $n_{82}$ of the positive lens in the eighth lens component L8 satisfy the following conditions.

$$n_{71} > 1.49 \quad (4)$$

$$n_{82} > 1.6 \quad (5)$$

The above conditions (4) and (5) prescribes, in the case that the third lens group G3 has a so-called Gauss type configuration, the refractive index of the positive lens L71 in the seventh lens component L7 and the refractive index of the positive lens L82 in the eighth lens component L8. If the refractive index of the positive lens L71 in the seventh lens group L7 and the refractive index of the positive lens L82 in the eighth lens group L8 are out of the range defined in conditions (4) and (5), the radii of curvature of the air side surfaces (i.e. the surfaces that are in contact with the air) of the seventh lens component L7 and the eighth lens component L8 are required to be made small in order to reduce the Petzval sum, and coma is deteriorated.

EXAMPLES

In the following, specific examples of the immersion microscope objective lenses according to the present invention will be described. The following three examples correspond to the immersion microscope objective lenses according to the above-described first to third embodiments respectively, and the lens configuration diagrams (FIGS. 1, 3 and 5) of the first to the third embodiments apply to the lens configurations of the first to third embodiments respectively.

Figure 2:
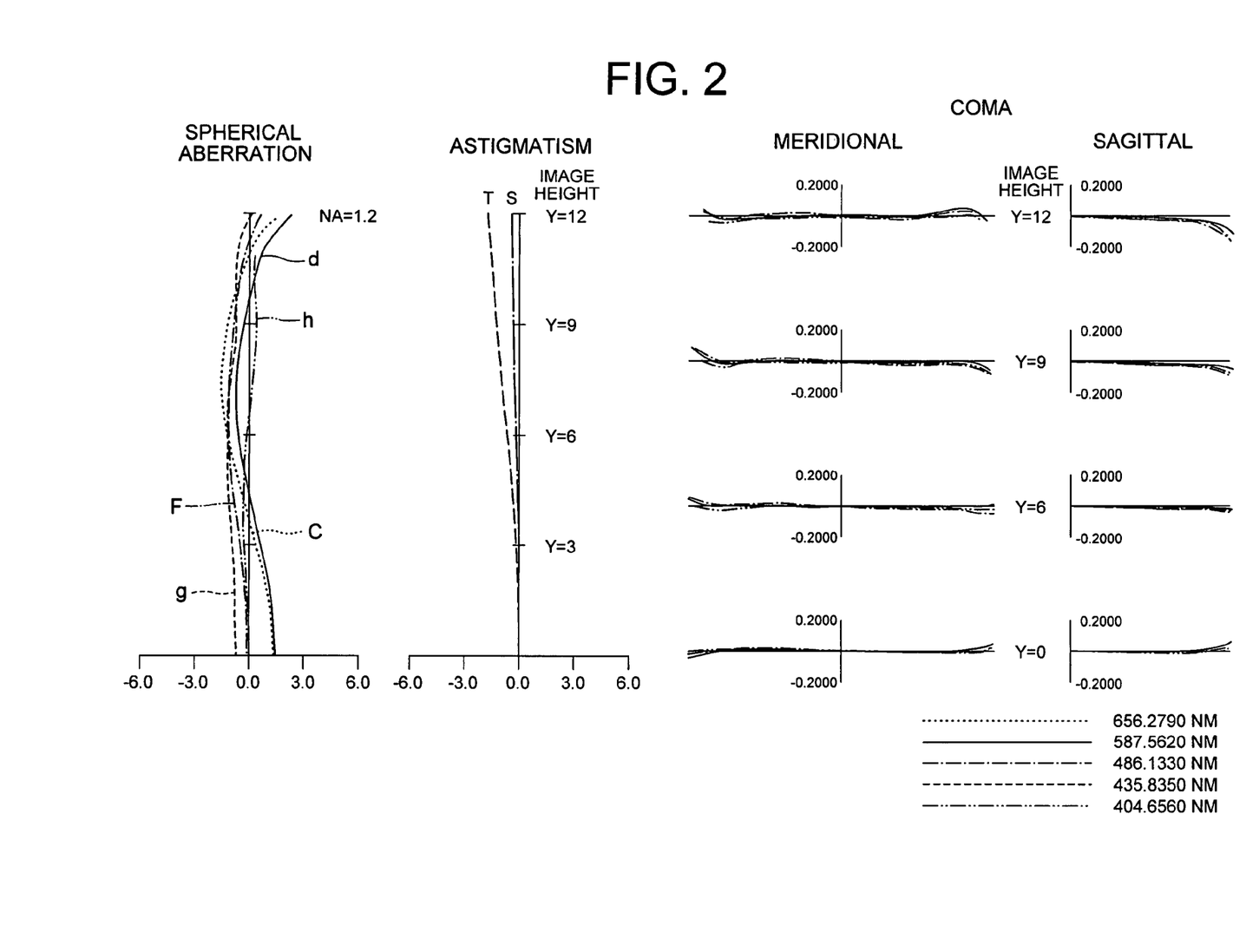
FIG. 2 shows various aberrations of the immersion microscope objective lens according to the first embodiment of the present invention.
Figure 4:
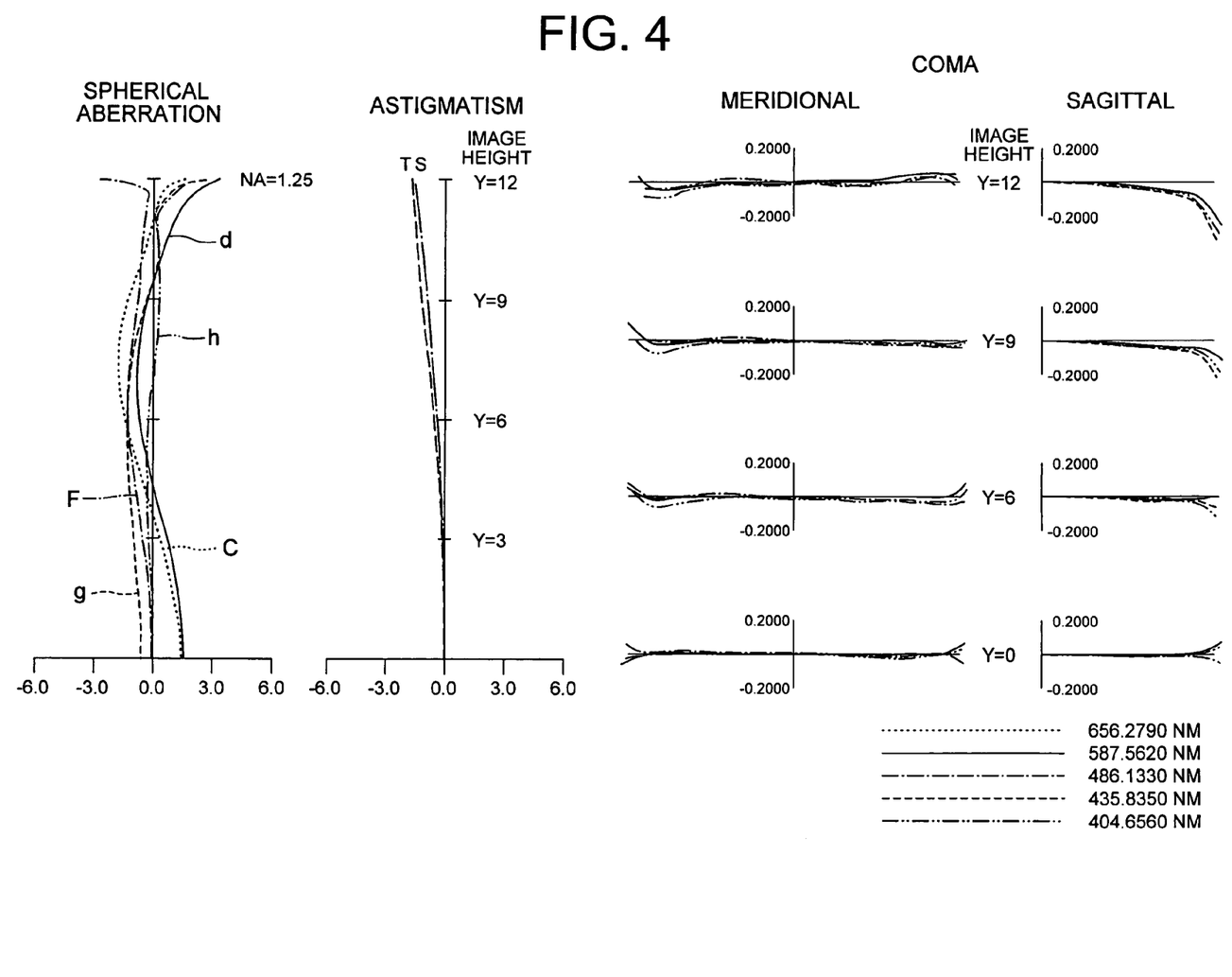
FIG. 4 shows various aberrations of the immersion microscope objective lens according to the second embodiment of the present invention.
Figure 6:
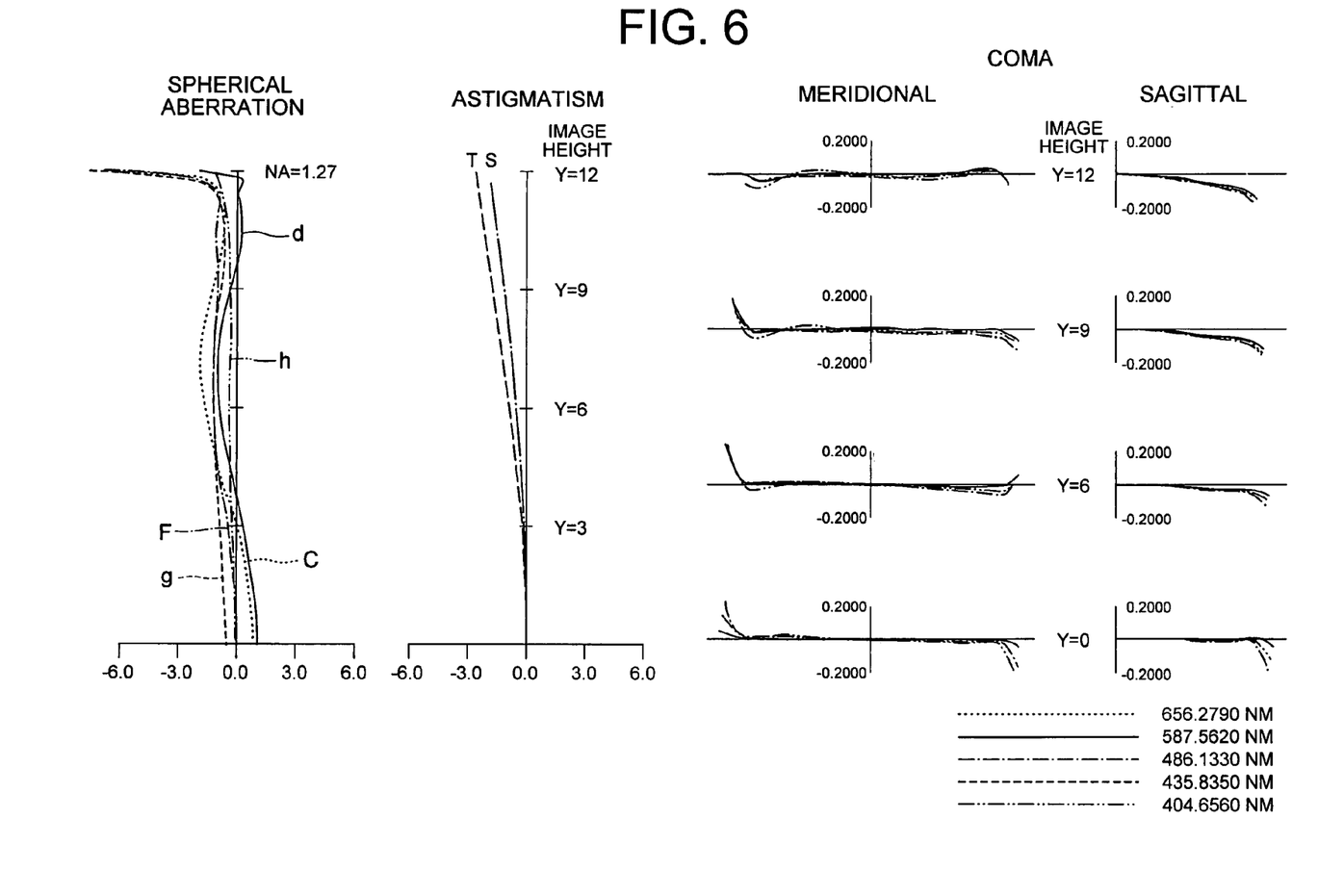
FIG. 6 shows various aberrations of the immersion microscope objective lens according to the third embodiment of the present invention.

In the tables (Table 1, 2 and 3) for the first to third examples, β represents the magnification, NA represents the numerical aperture, WD represents the distance from the surface of the cover glass (a plane parallel glass disposed between the object and the first lens surface) that facing the objective lens to the first lens surface of the first lens group G1, and F represents the synthesized focal length of the whole lens system. The surface numbers in each table represent the sequential numbers of the lens surfaces counted from the object side, r represents the radius of curvature of each lens surface, d represents the distance between adjacent lens surfaces, nd represents the refractive index for the d-line (587.5620 nm) of the glass that constitutes each lens, and vd represents the Abbe constant of each lens (glass) for the d-line. FIGS. 2, 4 and 6 show aberrations (spherical aberration, astigmatism and coma) for the d-line, the g-line (435.8350 nm), the C-line (656.2790 nm), the F-line (486.1330) and the h-line (404.6560 nm) in the first to third examples respectively. In each diagram of astigmatism, the broken line represents the meridional image surface and the dotted line represents the sagittal image surface. In the following examples, immersion liquid is water with nd=1.33249 and vd=55.97, and the cover glass is designed with the standards of t(thickness)=0.17, nd=1.52216 and vd=58.80.

First Example

The immersion microscope objective lens used in the first example is an apochromat microscope objective lens with a magnification of 60× and a numerical aperture of 1.2 using water as immersion liquid. Specific values associated with the lens configuration of the first example are presented in Table 1 below.

TABLE 1

β = −60.0, NA = 1.2, WD = 0.27, F = 3.339
|n0−n11| = 0.126

| surface no. | r | d | nd | vd | lens |
|---|---|---|---|---|---|
| 1 | −29.3564 | 0.700 | 1.45850 | 67.8 | (L11) |
| 2 | −1.1000 | 2.800 | 1.81600 | 46.6 | (L12) |
| 3 | −3.0349 | 0.100 | | | |
| 4 | −14.8612 | 2.650 | 1.59240 | 68.3 | (L2) |
| 5 | −6.3002 | 0.150 | | | |
| 6 | −29.0367 | 1.000 | 1.51742 | 52.3 | (L31) |
| 7 | 11.5315 | 7.085 | 1.49782 | 82.5 | (L32) |
| 8 | −11.4194 | 0.150 | | | |
| 9 | 63.7879 | 1.000 | 1.56384 | 60.7 | (L41) |
| 10 | 12.9423 | 6.690 | 1.43385 | 95.3 | (L42) |
| 11 | −16.3408 | 1.000 | | | |
| 12 | −81.6530 | 1.000 | 1.64000 | 60.1 | (L51) |
| 13 | 13.1388 | 6.801 | 1.43385 | 95.3 | (L52) |
| 14 | −16.2293 | 0.200 | | | |
| 15 | 12.7744 | 1.500 | 1.75500 | 52.3 | (L61) |
| 16 | 8.9350 | 6.810 | 1.43385 | 95.3 | (L62) |
| 17 | −12.3963 | 1.000 | 1.61340 | 44.3 | (L63) |
| 18 | 26.7738 | 0.200 | | | |
| 19 | 7.7784 | 4.378 | 1.49782 | 82.5 | (L71) |
| 20 | −60.0000 | 6.482 | 1.56384 | 60.7 | (L72) |
| 21 | 3.5807 | 3.060 | | | |
| 22 | −4.3737 | 5.406 | 1.69680 | 55.5 | (L81) |
| 23 | ∞ | 3.400 | 1.65412 | 39.7 | (L82) |
| 24 | −8.3147 | | | | |

(values corresponding to the conditions)

$$|r1/F| = 8.792 \quad (1)$$

$$|r2/F| = 0.329 \quad (2)$$

$$|n12 - n11| = 0.357 \quad (3)$$

$$n71 = 1.49782 \quad (4)$$

$$n82 = 1.65412 \quad (5)$$

Various aberration diagrams for the first example are shown in FIG. 2. From these diagrams, it will be understood that in the immersion microscope objective lens according to the first example, chromatic aberration is corrected up to NA=1.2 and a field of view number of 25 for the h-line in addition to for the d-line, C-line, F-line and g-line in the normal apochromat microscope objective lens.

Second Example

The immersion microscope objective lens used in the second example is an apochromat microscope objective lens with a magnification of 60× and a numerical aperture of 1.25 using water as immersion liquid. Specific values associated with the lens configuration of the second example are presented in Table 2 below.

TABLE 2

$\beta = -60.0$, NA = 1.25, WD = 0.27, F = 3.339
$|n0-n11| = 0.126$

| surface no. | r | d | nd | vd | lens |
|---|---|---|---|---|---|
| 1 | −14.5828 | 0.700 | 1.45850 | 67.8 | (L11) |
| 2 | −1.1000 | 2.209 | 1.81600 | 46.6 | (L12) |
| 3 | −2.6100 | 0.100 | | | |
| 4 | −12.0000 | 2.881 | 1.59240 | 68.3 | (L2) |
| 5 | −5.5716 | 0.150 | | | |
| 6 | −19.7945 | 1.000 | 1.51742 | 52.3 | (L31) |
| 7 | 11.1665 | 8.027 | 1.49782 | 82.5 | (L32) |
| 8 | −10.7830 | 0.150 | | | |
| 9 | 86.3534 | 1.000 | 1.56384 | 60.7 | (L41) |
| 10 | 12.8470 | 7.500 | 1.43385 | 95.3 | (L42) |
| 11 | −16.1318 | 1.000 | | | |
| 12 | −113.6264 | 1.000 | 1.64000 | 60.1 | (L51) |
| 13 | 14.2946 | 6.934 | 1.43385 | 95.3 | (L52) |
| 14 | −18.1199 | 0.200 | | | |
| 15 | 13.4379 | 1.500 | 1.81600 | 46.6 | (L61) |
| 16 | 10.0687 | 7.000 | 1.43385 | 95.3 | (L62) |
| 17 | −13.6579 | 1.000 | 1.61340 | 44.3 | (L63) |
| 18 | 37.4621 | 0.200 | | | |
| 19 | 7.5000 | 5.015 | 1.49782 | 82.5 | (L71) |
| 20 | −60.0000 | 5.117 | 1.64000 | 60.1 | (L72) |
| 21 | 3.6491 | 3.409 | | | |
| 22 | −4.3438 | 3.967 | 1.69680 | 55.5 | (L81) |
| 23 | 268.0706 | 3.500 | 1.65412 | 39.7 | (L82) |
| 24 | −7.6149 | | | | |

(values corresponding to the conditions)

$|r1/F|=4.368$ (1)

$|r2/F|=0.329$ (2)

$|n12-n11|=0.357$ (3)

$n71=1.49782$ (4)

$n82=1.65412$ (5)

Various aberration diagrams for the second example are shown in FIG. 4. From these diagrams, it will be understood that in the immersion microscope objective lens according to the second example, chromatic aberration is corrected up to NA=1.25 and a field of view number of 25 for the h-line in addition to for the d-line, C-line, F-line and g-line in the normal apochromat microscope objective lens.

Third Example

The immersion microscope objective lens used in the third example is an apochromat microscope objective lens with a magnification of 60× and a numerical aperture of 1.27 using water as immersion liquid. Specific values associated with the lens configuration of the third example are presented in Table 3 below.

TABLE 3

$\beta = -60.0$, NA = 1.27, WD = 0.20, F = 3.327
$|n0-n11| = 0.126$

| surface no. | r | d | nd | vd | lens |
|---|---|---|---|---|---|
| 1 | −17.9288 | 0.700 | 1.45850 | 67.8 | (L11) |
| 2 | −1.1000 | 2.290 | 1.81600 | 46.6 | (L12) |
| 3 | −2.5955 | 0.100 | | | |
| 4 | −12.3033 | 2.940 | 1.59240 | 68.3 | (L2) |
| 5 | −5.5942 | 0.150 | | | |
| 6 | −17.3966 | 1.000 | 1.51742 | 52.3 | (L31) |
| 7 | 10.8005 | 8.520 | 1.49782 | 82.5 | (L32) |
| 8 | −10.6596 | 0.150 | | | |
| 9 | 60.1123 | 1.000 | 1.56384 | 60.7 | (L41) |
| 10 | 12.2858 | 7.500 | 1.43385 | 95.3 | (L42) |
| 11 | −17.3742 | 1.000 | | | |
| 12 | −94.5784 | 1.000 | 1.64000 | 60.1 | (L51) |
| 13 | 15.8410 | 6.500 | 1.43385 | 95.3 | (L52) |
| 14 | −18.1970 | 0.200 | | | |
| 15 | 14.0273 | 1.500 | 1.81600 | 46.6 | (L61) |
| 16 | 10.5426 | 6.900 | 1.43385 | 95.3 | (L62) |
| 17 | −11.9035 | 1.000 | 1.61340 | 44.3 | (L63) |
| 18 | 37.8805 | 0.200 | | | |
| 19 | 7.5000 | 4.860 | 1.49782 | 82.5 | (L71) |
| 20 | −63.3366 | 5.300 | 1.64000 | 60.1 | (L72) |
| 21 | 3.7585 | 3.320 | | | |
| 22 | −4.4706 | 4.000 | 1.69680 | 55.5 | (L81) |
| 23 | 45.7201 | 3.500 | 1.65412 | 39.7 | (L82) |
| 24 | −7.6922 | | | | |

(values corresponding to the conditions)

$|r1/F|=5.389$ (1)

$|r2/F|=0.331$ (2)

$|n12-n11|=0.357$ (3)

$n71=1.49782$ (4)

$n82=1.65412$ (5)

Figure 7:
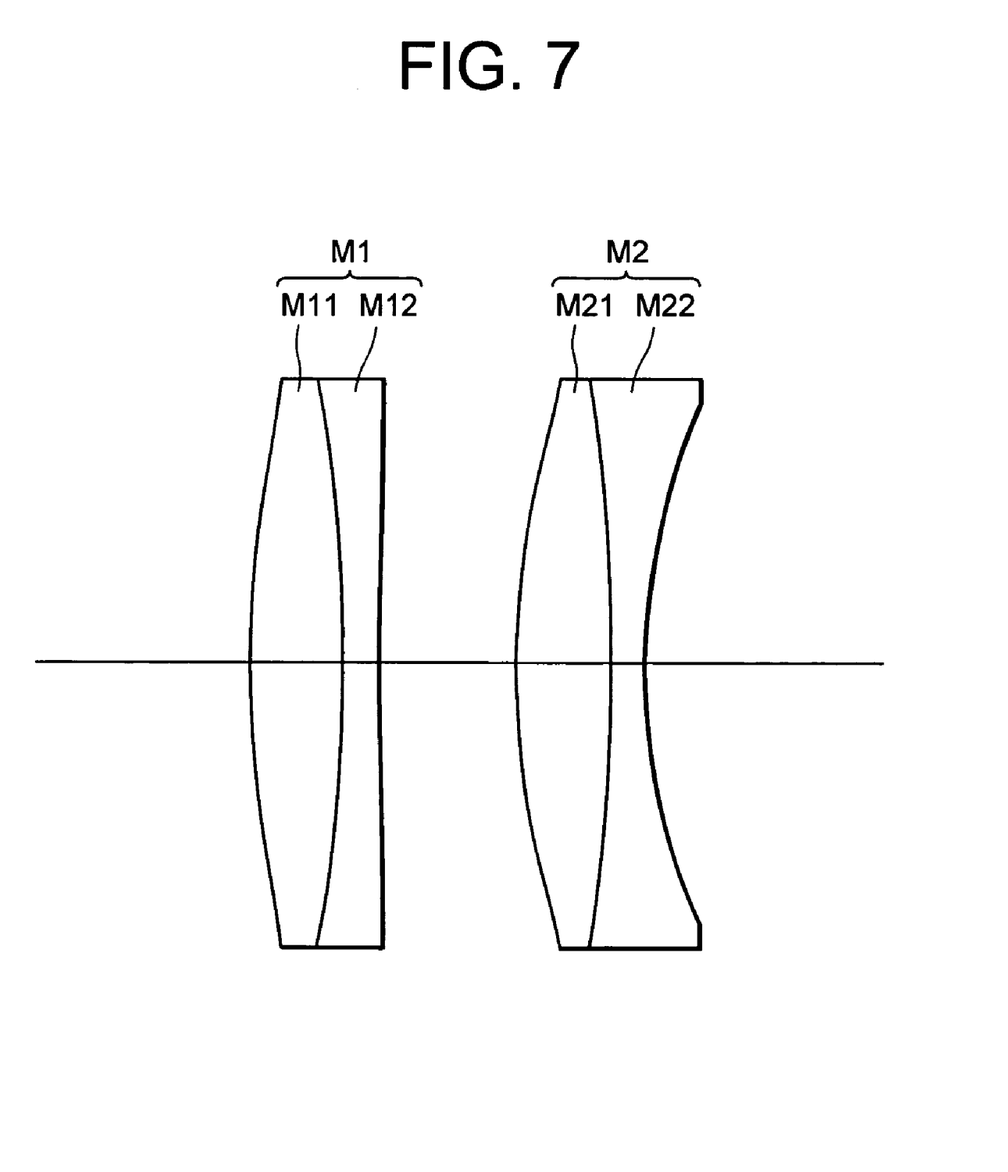
FIG. 7 is a diagram showing the lens configuration of an imaging lens that is to be used in combination with any one of first to third examples the immersion microscope objective lens corresponding to the first to third embodiments.

Various aberration diagrams for the third example are shown in FIG. 6. From these diagrams, it will be understood that in the immersion microscope objective lens according to the third example, chromatic aberration is corrected up to NA=1.27 and a field of view number of 25 for the h-line in addition to for the d-line, C-line, F-line and g-line in the normal apochromat microscope objective lens FIG. 7 is a diagram showing the configuration of the imaging lens to be used in combination with each of the immersion microscope objective lenses of the above-described examples. The imaging lens includes a first cemented lens composed of a biconvex lens M11 and a biconcave lens M12 cemented to each other and a second cemented lens composed of a biconvex lens M21 and a biconcave lens M22 cemented to each other. Table 4 shows an example of lens data of this imaging lens. In Table 4, the surface numbers represents the sequential numbers of the lens surfaces counted from the object side, r represents the radius of curvature of each lens surface, d represents the distance between adjacent lens surfaces, nd represents the refractive index for the d-line of the glass that constitutes each lens, and vd represents the Abbe constant of each lens (glass) for the d-line.

TABLE 4

| surface no. | r | d | nd | vd | lens |
|---|---|---|---|---|---|
| 1 | 75.040 | 5.1 | 1.62280 | 57.03 | (M11) |
| 2 | −75.040 | 2.0 | 1.74950 | 35.19 | (M12) |
| 3 | 1600.580 | 7.5 | | | |

TABLE 4-continued

| surface no. | r | d | nd | vd | lens |
|---|---|---|---|---|---|
| 4 | 50.260 | 5.1 | 1.66755 | 41.96 | (M21) |
| 5 | −84.540 | 1.8 | 1.61266 | 44.41 | (M22) |
| 6 | 36.910 | | | | |

When the imaging lens having the specifications presented above is used, the distance between the imaging lens and the immersion microscope objective lens according to any of the first to third examples is practically set in the range from 50 mm to 180 mm with no particular problems. The aberration diagrams shown in FIGS. 2, 4 and 6 are for the case in which the aforementioned distance is set to 150 mm. Those results do not vary significantly so long as the aforementioned distance is set in the range of 50 mm to 180 mm.

As per the above, it will be understood that in the immersion microscope objective lens according to the present invention, various aberrations (such as spherical aberration, astigmatism and coma) can be corrected excellently over a large field of view (NA=1.2 to 1.27) and over a large wavelength range (the g-line, C-line, F-line, g-line and h-line), and it is possible to achieve excellent imaging performance.

What is claimed is:

1. An immersion microscope objective lens comprising, in the following order from an object side to an image side:
   a first lens group having positive refractive power as a whole, including, in the following order from the object side to the image side, a first lens component comprising a first meniscus lens and a second meniscus lens cemented to each other with their concave surfaces facing the object side, with the first meniscus lens having a surface disposed to contact an immersion liquid, a second lens component comprising a single lens having positive refractive power and a third lens component comprising a negative lens and a positive lens cemented to each other;
   a second lens group having positive refractive power as a whole, including a fourth lens component comprising a negative lens and a positive lens cemented to each other; and
   a third lens group having negative refractive power as a whole,
   wherein the following conditions are satisfied:

$1 < |r_1/F| < 50$ $0.1 < |r_2/F| < 0.6$ where $r_1$ is the radius of curvature of the surface of said first meniscus lens that is disposed to contact the immersion liquid, $r_2$ is the radius of curvature of the interface surface of said first meniscus lens and said second meniscus lens, and F is the focal length of the whole system.

2. The immersion microscope objective lens according to claim 1, wherein the following condition is satisfied:

$|n_{12} - n_{11}| > 0.3$ where $n_{11}$ is the refractive index of said first meniscus lens and $n_{12}$ is the refractive index of said second meniscus lens.

3. The immersion microscope objective lens according to claim 1, wherein said second lens group includes, in the following order from the object side to the image side, said fourth lens component, a fifth lens component comprising a negative lens and a positive lens cemented to each other, a sixth lens component comprising a negative meniscus lens with a convex surface facing the object side, a biconvex lens and a biconcave lens cemented to each other in the mentioned order from the object side.

4. The immersion microscope objective lens according to claim 1, wherein said third lens group comprises, in the following order from the object side to the image side, a fifth lens component comprising a positive lens and a negative lens cemented to each other and having a meniscus lens shape with a convex surface facing the object side and a sixth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the fifth lens component and $n_{82}$ is the refractive index of said positive lens of the sixth lens component.

5. The immersion microscope objective lens according to claim 2, wherein said second lens group includes, in the following order from the object side to the image side, said fourth lens component, a fifth lens component comprising a negative lens and a positive lens cemented to each other, a sixth lens component comprising a negative meniscus lens with a convex surface facing the object side, a biconvex lens and a biconcave lens cemented to each other in the mentioned order from the object side.

6. The immersion microscope objective lens according to claim 5, wherein said third lens group comprises, in the following order from the object side to the image side, a seventh lens component comprising a positive lens and a negative lens cemented to each other and having a meniscus lens shape with a convex surface facing the object side and an eighth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the seventh lens component and $n_{82}$ is the refractive index of said positive lens of the eighth lens component.

7. The immersion microscope objective lens according to claim 2, wherein said third lens group comprises, in the following order from the object side to the image side, a fifth lens component comprising a positive lens and a negative lens cemented to each other and having a meniscus lens shape with a convex surface facing the object side and a sixth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the fifth lens component and $n_{82}$ is the refractive index of said positive lens of the sixth lens component.

8. The immersion microscope objective lens according to claim 3, wherein said third lens group comprises, in the following order from the object side to the image side, a seventh lens component comprising a positive lens and a negative lens cemented to each other and having a meniscus lens shape with a convex surface facing the object side and an eighth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the seventh lens component and $n_{82}$ is the refractive index of said positive lens of the eighth lens component.

9. An immersion microscope objective lens comprising, in the following order from an object side to an image side:
   a first lens group having positive refractive power as a whole, including, in the following order from the object side to the image side, a first lens component comprising a first meniscus lens and a second meniscus lens cemented to each other with their concave surfaces facing the object side, with the first meniscus lens having a surface disposed to contact an immersion liquid, a second lens component comprising a single lens having positive refractive power and a third lens component comprising a negative lens and a positive lens cemented to each other;
   a second lens group having positive refractive power as a whole, including a fourth lens component comprising a negative lens and a positive lens cemented to each other; and
   a third lens group having negative refractive power as a whole,
   wherein the following conditions are satisfied:

$1 < |r_1/F| < 50$ $0.1 < |r_2/F| < 1.5$ where $r_1$ is the radius of curvature of the surface of said first meniscus lens that is disposed to contact the immersion liquid, $r_2$ is the radius of curvature of the interface surface of said first meniscus lens and said second meniscus lens, and F is the focal length of the whole system, and
   wherein said second lens group includes, in the following order from the object side to the image side, said fourth lens component, a fifth lens component comprising a negative lens and a positive lens cemented to each other, a sixth lens component comprising a negative meniscus lens with a convex surface facing the object side, a biconvex lens and a biconcave lens cemented to each other in the mentioned order from the object side.

10. An immersion microscope objective lens comprising, in the following order from an object side to an image side:
   a first lens group having positive refractive power as a whole, including, in the following order from the object side to the image side, a first lens component comprising a first meniscus lens and a second meniscus lens cemented to each other with their concave surfaces facing the object side, with the first meniscus lens having a surface disposed to contact an immersion liquid, a second lens component comprising a single lens having positive refractive power and a third lens component comprising a negative lens and a positive lens cemented to each other;
   a second lens group having positive refractive power as a whole, including a fourth lens component comprising a negative lens and a positive lens cemented to each other; and
   a third lens group having negative refractive power as a whole,
   wherein the following conditions are satisfied:

$1 < |r_1/F| < 50$ $0.1 < |r_2/F| < 1.5$ where $r_1$ is the radius of curvature of the surface of said first meniscus lens that is disposed to contact the immersion liquid, $r_2$ is the radius of curvature of the interface surface of said first meniscus lens and said second meniscus lens, and F is the focal length of the whole system, and
   wherein said third lens group comprises, in the following order from the object side to the image side, a fifth lens component comprising a positive lens and a negative lens cemented to each other and having a meniscus lens shape with a convex surface facing the object side and a sixth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the fifth lens component and n82 is the refractive index of said positive lens of the sixth lens component.

11. An immersion microscope objective lens comprising, in the following order from an object side to an image side:
   a first lens group having positive refractive power as a whole, including, in the following order from the object side to the image side, a first lens component comprising a first meniscus lens and a second meniscus lens cemented to each other with their concave surfaces facing the object side, with the first meniscus lens having a surface disposed to contact an immersion liquid, a second lens component comprising a single lens having positive refractive power and a third lens component comprising a negative lens and a positive lens cemented to each other;
   a second lens group having positive refractive power as a whole, including a fourth lens component comprising a negative lens and a positive lens cemented to each other; and
   a third lens group having negative refractive power as a whole,
   wherein the following conditions are satisfied:

$1 < |r_1/F| < 50$ $0.1 < |r_2/F| < 1.5$ $|n_{12} - n_{11}| > 0.3$ where $r_1$ is the radius of curvature of the surface of said first meniscus lens that is disposed to contact the immersion liquid, $r_2$ is the radius of curvature of the interface surface of said first meniscus lens and said second meniscus lens, F is the focal length of the whole system, $n_{11}$ is the refractive index of said first meniscus lens, and $n_{12}$ is the refractive index of said second meniscus lens, and wherein said second lens group includes, in the following order from the object side to the image side, said fourth lens component, a fifth lens component comprising a negative lens and a positive lens cemented to each other, a sixth lens component a negative meniscus lens with a convex surface facing the object side, a biconvex lens and a biconcave lens cemented to each other in the mentioned order from the object side.

12. The immersion microscope objective lens according to claim 11, wherein said third lens group comprises, in the following order from the object side to the image side, a seventh lens component comprising a positive lens and a negative lens cemented to each other and having a meniscus lens shape with a convex surface facing the object side and an eighth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the seventh lens component and $n_{82}$ is the refractive index of said positive lens of the eighth lens component.

13. An immersion microscope objective lens comprising, in the following order from an object side to an image side:

a first lens group having positive refractive power as a whole, including, in the following order from the object side to the image side, a first lens component comprising a first meniscus lens and a second meniscus lens cemented to each other with their concave surfaces facing the object side, with the first meniscus lens having a surface disposed to contact an immersion liquid, a second lens component comprising a single lens having positive refractive power and a third lens component comprising a negative lens and a positive lens cemented to each other;

a second lens group having positive refractive power as a whole, including a fourth lens component comprising a negative lens and a positive lens cemented to each other; and a third lens group having negative refractive power as a whole, wherein the following conditions are satisfied:

$1 < |r_1/F| < 50$ $0.1 < |r_2/F| < 1.5$ $|n_{12} - n_{11}| > 0.3$ where $r_1$ is the radius of curvature of the surface of said first meniscus lens that is disposed to contact the immersion liquid, $r_2$ is the radius of curvature of the interface surface of said first meniscus lens and said second meniscus lens, F is the focal length of the whole system, $n_{11}$ is the refractive index of said first meniscus lens, and $n_{12}$ is the refractive index of said second meniscus lens, and wherein said third lens group comprises, in the following order from the object side to the image side, a fifth lens component comprising a positive lens and a negative lens cemented to each other and having a meniscus lens shape with a convex surface facing the object side and a sixth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens component and $n_{82}$ is the refractive index of said positive lens of the sixth lens component.

14. The immersion microscope objective lens according to claim 9, wherein said third lens group comprises, in the following order from the object side to the image side, a seventh lens component comprising a positive lens and a negative lens cemented to each other and having a meniscus lens shape with a convex surface facing the object side and an eighth lens component comprising a negative lens and a positive lens cemented to each other and having a meniscus lens shape with a concave surface facing the object side, and the following conditions are satisfied:

$n_{71} > 1.49$ $n_{82} > 1.6$ where $n_{71}$ is the refractive index of said positive lens of the seventh lens component and $n_{82}$ is the refractive index of said positive lens of the eighth lens component.

* * * * *